May 22, 1962     F. J. LUKETA     3,035,365
CONNECTOR FOR TRAWL NETS
Filed Jan. 30, 1961     3 Sheets-Sheet 1
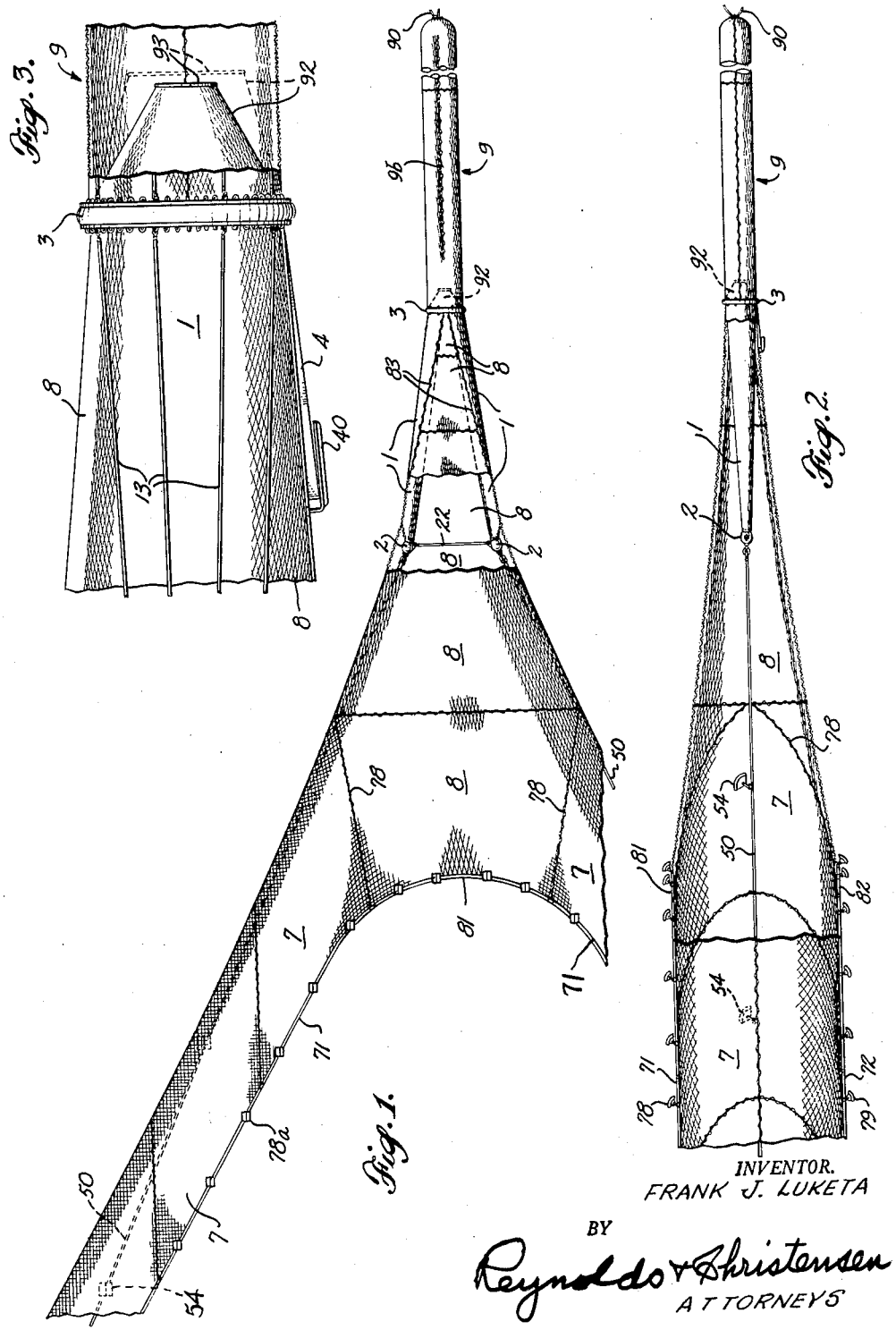
INVENTOR.
FRANK J. LUKETA
BY
Reynolds & Christensen
ATTORNEYS

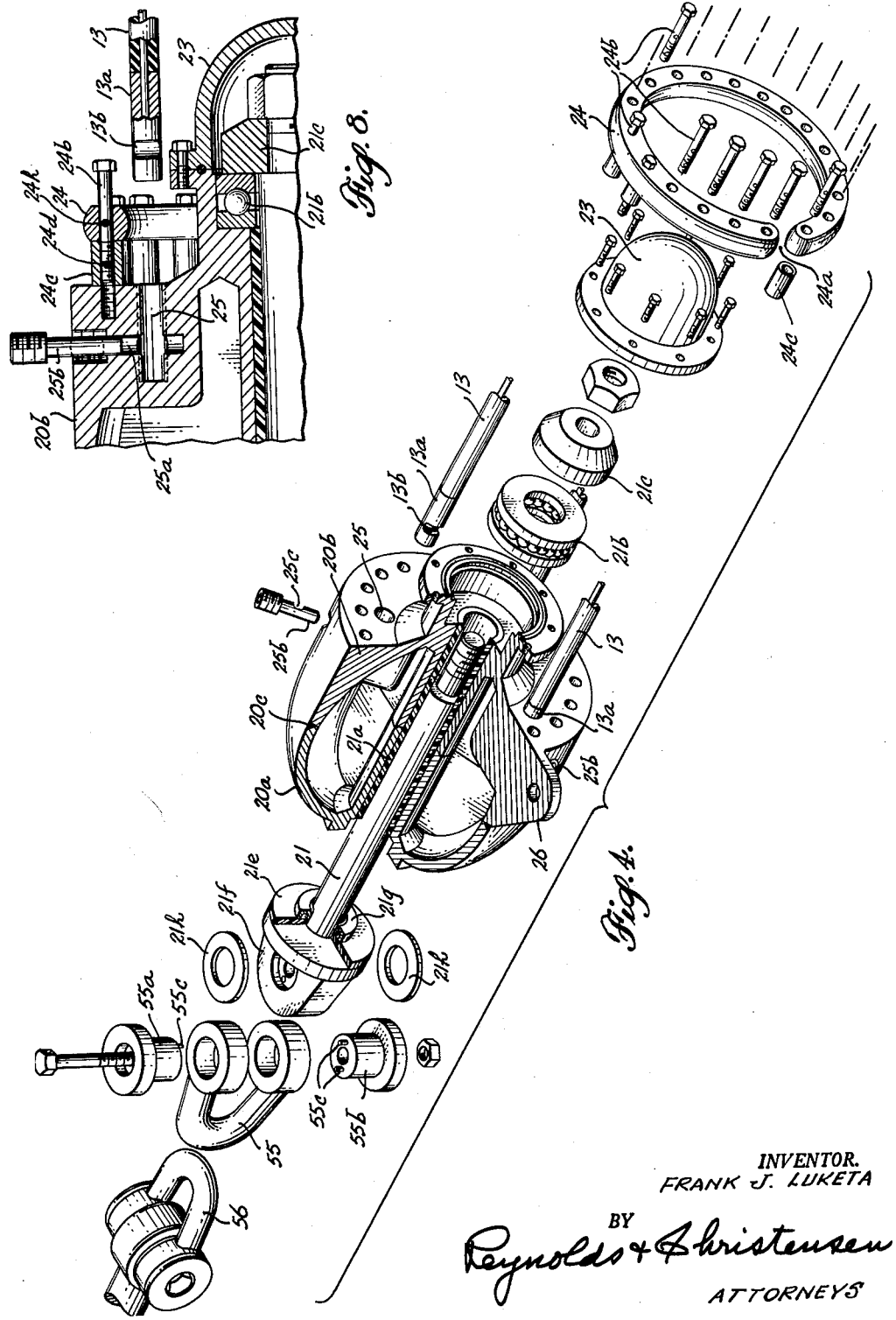

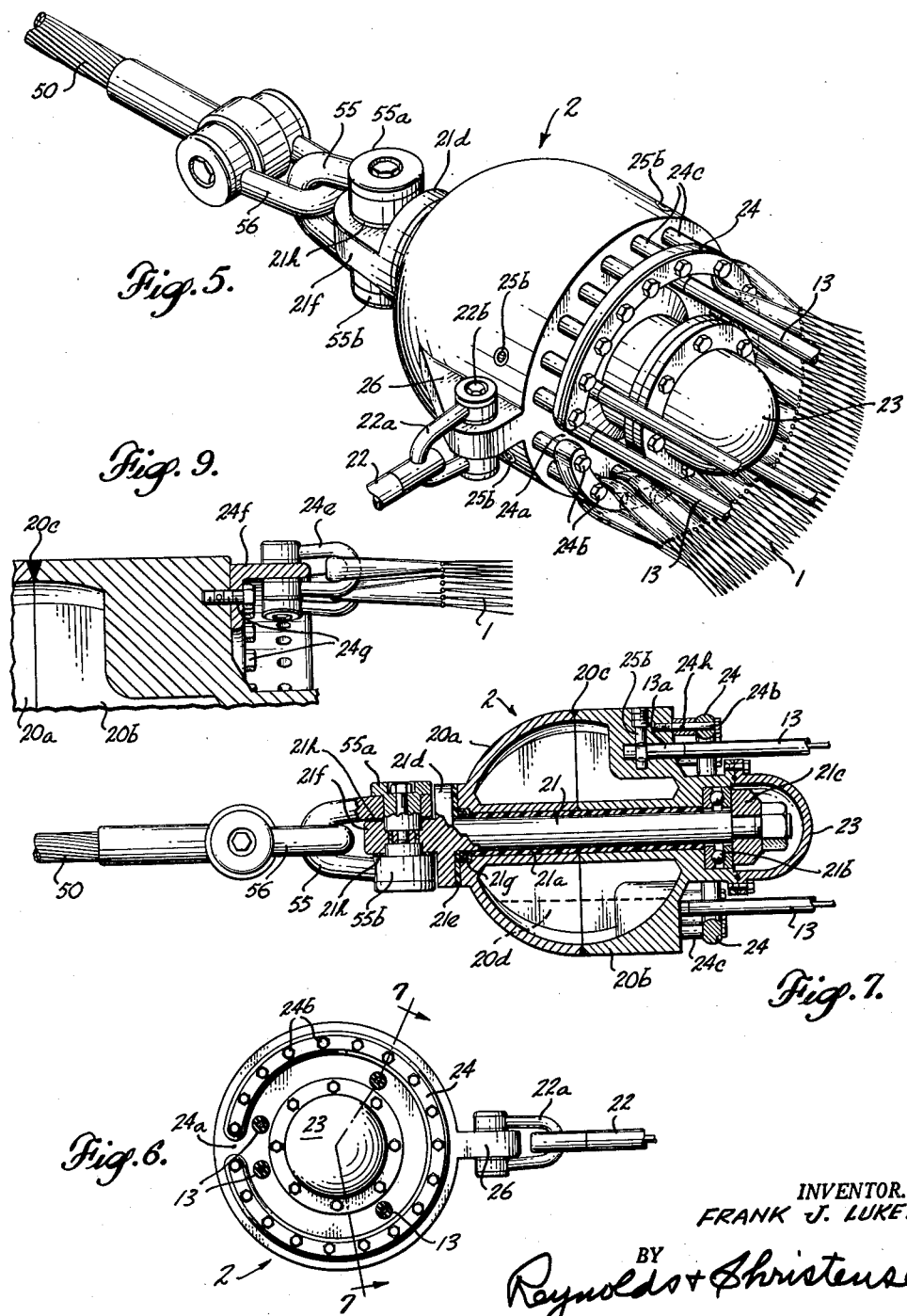

United States Patent Office 3,035,365
Patented May 22, 1962

3,035,365
CONNECTOR FOR TRAWL NETS
Frank J. Luketa, 5567 Greenwood Ave., Seattle, Wash.
Filed Jan. 30, 1961, Ser. No. 85,663
10 Claims. (Cl. 43—9)

This invention relates to trawl nets of large capacity, capable of receiving one hundred tons or more of fish in their codends, and of hauling the codend thus loaded in a virtually continuous operation over the stern and onto the deck of the trawler by what is known as the drum trawling method. Such nets are disclosed in my copending application Serial No. 8,170, filed January 3, 1961, entitled Large Capacity Midwater Trawl Net.

Such nets include a codend of heavy twine mesh, and quite an appreciable number of transverse meshes of such twine, properly oriented, are required to withstand the stress to which the loaded codend is subjected during hauling. The codend must be dragged by means of sweep lines extending forwardly to doors, themselves dragged by towing warps extending downwardly and aft from the trawler, and must be hauled initially by means of the warp lines (when hauling in the trawl net after the drag) and finally by means of hauling lines which are connected to the sweep lines, the latter being then disconnected from the doors. These various lines can be of adequate strength, but the sweep lines can not be connected directly to the codend; rather, the two are interconnected by suspenders of heavy twine mesh which converge to a point at their forward end, and which at their after end spread about the forward end of the codend to distribute the stress to the latter. The general form and the relationship of these elements is disclosed in my application referred to above.

It can be realized that if only two suspenders are used, as is preferred, the entire stress of the loaded codend is concentrated at the points of connection of the sweep lines to the respective suspenders. The interconnection at this point must be of small size, and should be of small weight, but more especially it should be such as will not overstress any individual mesh or twine, and will distribute the load rather equally to all the meshes. It should also be of a construction which will enable the connection to the suspender to be made quickly, accurately, and with equitable distribution of stresses, under working conditions, for occasionally it may be necessary to replace a damaged suspender while on the fishing grounds. The connector should be of a construction to accommodate riblines, a restrictor line, and the like which are required. It should incorporate a necessary swivel and provide an antifriction bearing for the same, yet protect this and other delicate parts from access of salt water. It should, nevertheless, be of simple construction, and capable, with little alteration, of being used for midwater or for bottom trawling. These are the objects of this invention, and other objects will appear more fully hereinafter.

A preferred and an alternative form of the connector are shown in the drawings, and it will be clear that other modifications may be made without departing from the invention, as further disclosed and claimed herein.

FIGURE 1 is a plan view, partly broken away, of a midwater trawl net incorporating the connector of this invention.

FIGURE 2 is a side elevation and partial longitudinal vertical section of the same net.

FIGURE 3 is an enlarged side elevation of the net at the region where the suspenders and codend are joined.

FIGURE 4 is an exploded isometric view, partly in section, of the connector.

FIGURE 5 is an isometric view of the connector, fully assembled and connected to the mesh of the suspender.

FIGURE 6 is a view looking at the after end of the connector.

FIGURE 7 is an axial sectional view of the connector, taken on the line 7—7 of FIGURE 6.

FIGURE 8 is an enlarged axial sectional view of the connector, illustrating particularly the manner of connecting a ribline to the connector.

FIGURE 9 is an enlarged axial sectional view of a modified form of the connector, illustrating a different form of anchorage for the suspender meshes.

Reference to FIGURES 1 to 3 will make clear the environment of the connector, and its function. A codend 9, pursed at 90 at its after end and held open at its forward end by an expander ring 3, is of heavy twine, and many meshes "around" or in circumference. A funnel 8 of light twine diverges forwardly from the open forward end of the codend, its after end being in effect joined to the same expander ring 3. Curtains 7, laced at 78 to the side edges of the funnel, spread forwardly, and are connected along their own edges to upper and lower curtain lines 71 and 72, respectively. Bosom lines 81 and 82 across the upper and lower bosoms of the net, respectively, join the corresponding curtain line at opposite sides. The upper curtain and bosom lines are buoyed up by planing floats 78a, and the lower lines are depressed by planing weights 79.

The two suspenders 1, of heavy twine mesh, each spreads at its after end half-way about the open end of the codend, and is secured to the expander ring 3. Each converges at its forward end to a connector 2, which is the subject of this invention, to which is also connected a sweep line 50, buoyed up by planing floats 54. The longitudinal edges of the suspenders are laced at 83 to top and bottom funnel panels, and thereby the suspenders are incorporated within the funnel. Riblines 13 extending lengthwise of the suspenders limit tears in the mesh thereof.

The sweep lines 50 take substantially the entire stress of dragging and hauling the net. At their forward ends they are anchored to doors (not shown) which spread apart, and curtain lines 71, 72 are connected also to these doors, but are not subjected at any time to heavy stress. A restrictor 22 interconnects the opposite connectors 2 so that the lateral stress in the sweep lines will not unduly spread laterally the mesh of funnel 8.

The codend 9 is desirably decreased in loaded cross-sectional bulk by lacing together its top and bottom along longitudinal line 9b, yet retaining the same longitudinal tensile strength. A contractile trap 92 that projects within the entrance to the codend can expand to admit fish, but blocks their escape. A spiller panel 4 in the bottom of the funnel, immediately ahead of the codend entrance, can belly downwardly under the pressure of excess fish in the funnel, during hauling, depressing its guard flap 40, and so enabling escape of the excess, and relieving all parts of the net of an excessive load.

It is clear that the connectors 2 are subjected to half the entire load of the codend and its catch, which may amount to a load of fifty tons or more imposed on each connector. Also it is clear that the even distribution of load from the connector 2 to the mesh of the suspender is highly important, to avoid overstressing and breaking such mesh. Further, if breaks do occur, it is important to be able quickly to disconnect and replace a broken suspender.

The connector of this invention, preferably made of aluminum, indicated generally by the numeral 2, includes a two-part hollow shell, spherical or otherwise of streamlined shape in its forward half 20a, circular in its after half 20b, and welded together at 20c. By making it hollow it may have neutral or positive buoyancy, or can be weighted, as at 20d (FIGURE 7) to cause it to sink, as in a bottom trawling rig.

Provision is made for attachment of the sweep line 50 ahead of its forward half 20a. This is preferably through a built-in swivel. A shaft 21 is journaled in a radial bearing sleeve 21a of anti-friction material, such as nylon, and at its after end an end thrust bearing 21b is interposed between a washer 21c secured upon its end and the shell of the connector. The washer 21c and bearing 21b are housed in by the removable cap 23. At its forward end the shaft 21 protrudes through a seal 21g from the shell 20a—20b with a flange 21d seating exteriorly of the shell and with an anti-friction nylon washer interposed at 21e. The shaft has a terminal eye 21f to which a clevis 55 is secured, and with which a clevis 56 at the after end of sweep line 50 can be engaged or disengaged. The illustrated construction of the pivot of clevis 55, including pintles 55a and 55b, each having pins 55c that engage in sockets within eye 21f to prevent rotation of the pintles, but allow the clevis 55 to oscillate about the pintles. This, together with the nylon washers 21h, restricts wear to the expendable clevis and pintles only, sparing the eye 21f which together with its shaft would be a more costly and difficult replacement.

The meshes of the suspender 1 are connected at the generally planar after face of the after half 20b in such manner as to distribute these meshes round about the connector, and to equalize the stress upon the individual meshes. Two ways are disclosed for so doing. In all the detail views except FIGURE 9 a ring 24 is employed, which is uninterrupted except at 24a, which allows mesh to enter and be threaded onto the ring. The ring 24 is spaced from and secured to the connector 2 by equiangularly spaced bolts 24b and spacer sleeves 24c. The bolts thread into the connector shell, and can be suitably held against accidental threading out, as by a nylon plug 24d (see FIGURE 8 in particular). The ring 24 surrounds the cap 23, and is well rounded in cross section so that it will not chafe the meshes threaded upon it.

The forward edge of the suspender 1 would be a double selvage edge. For a net of the capacity indicated above this edge may have 144 such points, and they would be threaded upon the ring 24, eight double selvage points to each group, separated from the next group by a spacer 24c. The second nylon plug 24h on the bolts 24b is provided to keep the groups apart (with the inserted and thus retained bolts) once they are divided and prior to fastening the ring 24 to the connector 2. The bolts 24b would then be threaded home, and thus, in a minimum of time and with a minimum chance of confusion or error, the suspender would be connected to the connector 2 and sweep line 50, and the load equalized.

Alternatively, as shown in FIGURE 9, the mesh groups of the suspender's forward edge may each be connected to a clevis 24e, and these clevises may be pinned to a flange ring 24f bolted by bolts 24g to the connector shell.

Riblines 13 have been mentioned as associated with the suspenders. At their after end they are anchored to the expander ring 3, and must be anchored at their forward end to the connector 2. Each is swaged or otherwise secured to a forward metallic tip 13a, and the connector shell is socketed in its planar rear face, at 25, to receive these tips inside the circle of the suspender meshes. Each tip is transversely notched at 13b, and a bore 25a in the shell partially intersects each socket 25, and receives a locking pin 25b threaded in bore 25a, and notched at 25c. When the tip 13a is inserted fully within its socket 25 its notch 13b registers with bore 25a, and locking pin 25b in its locking position prevents withdrawal of the tip 13a, and so secures the ribline 13. If the notch 25c is turned to coincide with the socket 25, the tip 13a can be withdrawn.

The restrictor 22 joins the opposite connectors in a spaced relationship. A clevis 22a at the end of the restrictor is pinned at 22b to an ear 26 projecting laterally from the connector 2, or the interconnection may be accomplished in any suitable manner. The pivot of the clevis 22a (and that of clevis 56 and other such pivots also) may be constructed in the same manner as the pivot of clevis 55.

I claim as my invention:

1. A connector to which to anchor the forward edge of a mesh suspender and the after end of a sweep line, in a trawl net, comprising a body, means for securement of the sweep line to its forward portion, means encircling its after portion and defining a transverse plane, for engagement with successive meshes of the suspender's edge, means to space groups of such meshes generally equally about the body, and means to removably secure said encircling means to the body with the mesh groups so spaced.

2. A connector as in claim 1, including a shaft directed fore and aft through the body and swiveled therein, and projecting ahead of the body, end thrust bearing means interposed between said shaft and the body, and means at the projecting forward end of the shaft for connection of the sweep line.

3. A connector as in claim 2, including sealing means of of anti-friction material interposed between the shaft and the body.

4. A connector as in claim 1, including a ring having an opening, and constituting the encircling means, and bolts and sleeve spacers thereon distributed about said ring and constituting the mesh spacing and the ring securing means when the bolts are threaded into the body.

5. A connector as in claim 1, including a two-flanged ring and means to removably secure one flange thereof to the body, and clevises spaced about its other flange and removably secured thereto to constitute the mesh group spacing and securing means.

6. A connector as in claim 1, including sockets within the body and opening aft, adapted for reception of the tips of riblines extending lengthwise of the suspenders, and means to anchor each ribline tip within its socket.

7. A connector as in claim 6, wherein the sockets define a circle located inside the circle defined by the mesh-securing means.

8. A connector for use intermediate a sweep line and the mesh suspender of a trawl net, for transmission of all stress therebetween, comprising a hollow body of no greater than neutral buoyancy, said body having a planar after face, a shaft projecting ahead of the forward portion of said body, and extending axially fore and aft through the body, a swiveled end thrust bearing intermediate said shaft and the after end of said body, a ring having an opening through its circumference, and spacer sleeves and bolts extending fore and aft through said ring into the body at equiangularly spaced intervals, to receive and space groups of suspender meshes along the forward edge thereof.

9. A connector as in claim 8, including a cap secured to the after end of the body and water-tightly housing in said end thrust bearing.

10. A connector as in claim 8, including ballast for said hollow body, to lessen its buoyancy.

References Cited in the file of this patent

FOREIGN PATENTS 28,242/30    Australia _____ Aug. 13, 1931